United States Patent [19]

Saegusa

[11] Patent Number: 5,475,448
[45] Date of Patent: Dec. 12, 1995

[54] DRIVING METHOD FOR A GAS-DISCHARGE DISPLAY PANEL

[75] Inventor: Nobuhiko Saegusa, Yamanashi, Japan

[73] Assignee: Pioneer Electronic Corporation, Tokyo, Japan

[21] Appl. No.: 213,068

[22] Filed: Mar. 15, 1994

[30] Foreign Application Priority Data

Mar. 25, 1993 [JP] Japan .................................. 5-066955

[51] Int. Cl.$^6$ .................................................. H04N 9/12
[52] U.S. Cl. ........................... 348/797; 345/63; 345/214
[58] Field of Search .................................. 348/797, 739; 345/60, 63, 214; H04N 9/12, 5/66

[56] References Cited

U.S. PATENT DOCUMENTS

| | | | |
|---|---|---|---|
| 4,378,556 | 3/1983 | Wisnieff | 348/297 |
| 4,385,293 | 5/1983 | Wisnieff | 348/797 |
| 4,591,902 | 5/1986 | Masubuchi | 345/63 |
| 4,595,919 | 6/1986 | Holz et al. | 345/63 |
| 5,343,215 | 8/1994 | Tanaka | 345/214 |

*Primary Examiner*—Victor R. Kostak
*Attorney, Agent, or Firm*—Nikaido, Marmelstein, Murray & Oram

[57] ABSTRACT

Row electrodes of a display panel are divided into first row electrodes and second row electrodes. A field for the first row electrodes is divided into a plurality of sub-fields each of which has a time length different from other sub-fields to be allocated with a weight. A field for the second row electrodes is divided into a plurality of sub-fields which are the same as the sub-fields of the first row electrodes in time length. Scanning of the row electrodes starts at an exciting operation of a first row and ends at an erasing operation of a last row. Pixel data are extracted from an input signal, each of the pixel data includes luminance data which designates at least one corresponding sub-field. Scanning of the first row electrodes and the second row electrodes is performed in sequence in accordance with the arrangement of sub-fields of both the row groups.

4 Claims, 2 Drawing Sheets

DRIVING METHOD FOR A GAS-DISCHARGE DISPLAY PANEL

BACKGROUND OF THE INVENTION

The present invention relates to a method for driving a gas-discharge display such as a plasma display panel.

There has been known an image display device having a plasma display panel (hereinafter called a gas-discharge panel). In order to drive the panel, each field of a composite video signal is divided into a plurality of sub-fields on time axis. The sub-fields are differently weighted in order to impart a tone to the image on the display. Namely, the light emitting time from the energization of a pixel to the erasing of the light during the period of the sub-field is determined in accordance with the value of the weight.

Japanese Patent Application Laid-Open 4-195087 and Japanese Patent Application Laid-Open 5-41841 disclose driving methods for the gas-discharge panel. In the method, the time length of the sub-field is increased as the weight becomes large to increase the period of time for emitting the light in the gas-discharge panel in order to increase the luminance of the picture. However, the time length of the sub-field is limited by the time necessary for lighting all rows of the sub-field. Furthermore, in the prior art, the light emitting time is not so long compared with the un-lighting time. Consequently, the luminance can not be increased over the limitation.

SUMMARY OF THE INVENTION

An object of the present invention is to provide a driving method for a gas-discharge panel in which the time length of each sub-field, and hence the light emitting time, can be increased, thereby increasing the luminance of a picture on the panel.

According to the present invention, there is provided a method for driving electrodes of a gas-discharge display panel having a plurality of data electrodes and a plurality of row electrodes for displaying an image dependent on pixel data each of which comprises N digits.

The method comprises dividing the row electrodes into at least two row groups comprising first row electrodes and second row electrodes, dividing a field into N sub-fields each of which has a time length different from other sub-fields to be allocated with a weight and each weight corresponds to a digit of the pixel data, arranging sub-fields for the first row electrodes and sub-fields for the second row electrodes in such a manner that excitation of row electrodes of the sub-fields of one of the row groups finishes within the period of the sub-fields of the other row group to form a plurality of corresponding sub-field groups, executing interlaced scanning each of the corresponding sub-field groups in sequence, and driving the data electrode during each sub-field in accordance with the value of the digit of the pixel data for corresponding pixels.

Other objects and features of this invention will become understood from the following description with reference to the accompanying drawings.

DETAILED DESCRIPTION OF THE PREFERRED EMBODIMENT

Figure 1:
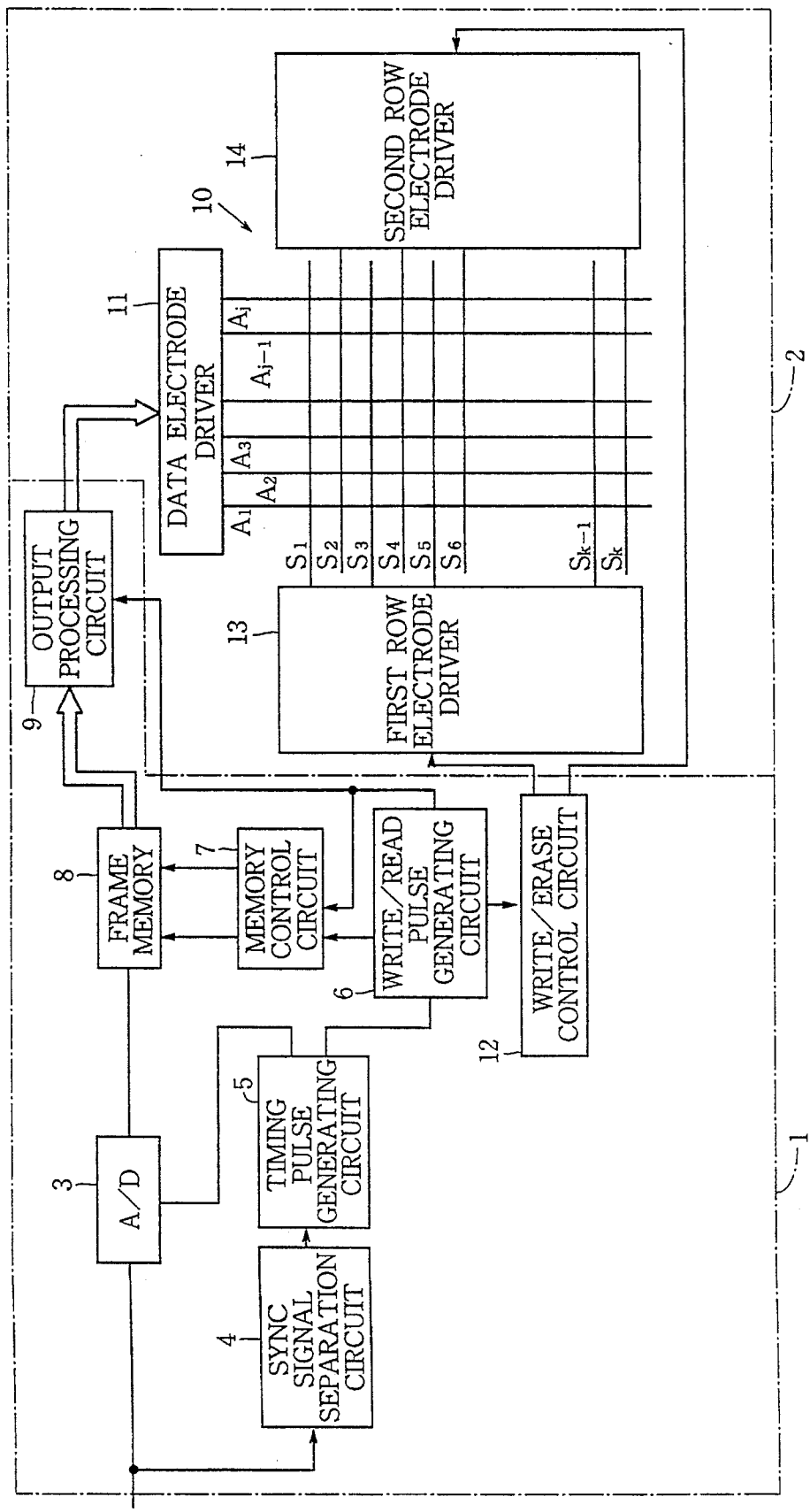
FIG. 1 is a block diagram showing an image display device of the present invention.

Referring to FIG. 1, an image display device of the present invention comprises a signal processing section 1 for processing a video signal, and a display section 2 for displaying a two-dimensional image responsive to a drive signal from the signal processing section 1.

The signal processing section 1 comprises an A/D converter 3 applied with the video signal and operated to convert the input video signal into pixel data each of which has 8-bit pixel data. The eight digits of the pixel data corresponds to the number of the sub-field as described hereinafter. The video signal is further applied to a sync signal separation circuit 4 which operates to extract horizontal and vertical synchronizing signals from the input video signal. The horizontal and vertical synchronizing signals are applied to a timing pulse generating circuit 5 which produces various timing pulses based on the synchronizing signals. The timing pulses are applied to the A/D converter 3 and a write/read pulse generating circuit 6. The A/D converter 3 is operated in synchronism with the timing pulse. The A/D converter 3 applies the pixel data to a frame memory 8. The write/read pulse generating circuit 6 produces writing pulses and reading pulses corresponding to the timing pulse. The reading pulses are applied to a memory control circuit 7. The memory control circuit 7 controls the frame memory 8 to store the pixel data from the A/D converter 3 in order in accordance with the matrix of the panel, and to read the pixel data for applying the data to an output processing circuit 9. The write/read pulse generating circuit 6 further applies the writing pulses to the output processing circuit 9 and a write/erase control circuit 12.

The output processing circuit 9 is operated to send the data voltages of 8 digits to a data electrode driver 11 of the display section 2 in synchronism with the writing pulse at every row. The electrode driver 11 applies a high data voltage (1) or a low data voltage (0) for every digit of the pixel data dependent on the pixel data to designated data electrodes at a corresponding timing.

The write/erase control circuit 12 produces an exciting pulse in synchronism with the writing pulse of the circuit 6. The control circuit 12 further produces a sustaining pulse for sustaining the emitting of light and an erasing pulse for erasing the light. The exciting, sustaining and erasing pulses are applied to a first row electrode driver 13 and a second row electrode driver 14 of the display section 2.

The display section 2 comprises a gas-discharge panel 10 having data electrodes $A_1, A_2, A_3 \ldots A_{j-1}$ and $A_j$, odd row electrodes $S_1, S_3, S_6 \ldots S_{k-1}$, and even row electrodes $S_2, S_4, S_6 \ldots S_k$, for performing interlaced scanning. Each of the data electrodes intersects each of the odd and even row electrodes to form a pixel. The data electrode driver 11 is connected to the data electrodes for driving the electrodes. The first row electrode driver 13 is connected to the odd row electrodes ($S_1, S_3 \ldots S_{k-1}$) and the second row electrode driver 14 is connected to the even row electrodes ($S_2, S_4 \ldots S_k$).

The first and second row electrode drivers 13 and 14 produce exciting pulses for driving odd and even row electrodes, respectively.

The operations of the output processing circuit 9 and the write/erase control circuit 12 are described with reference to FIG. 2.

Each field for the odd and even rows is divided into eight sub-fields, corresponding to the 8 bits of the pixel data. The time length of each sub-field is determined in accordance with its weight. The ratio of weights from the first sub-field to the eighth sub-field are, for example, $128(2^7):64(2^6):32(2^5):16(2^4):8(2^3):4(2^2):2(2^1):1(2^0)$.

Thus, the tone of $2^8(256)$ steps can be obtained by combining the eight weights. If the length of the field is F, the time lengths of the respective sub-fields are determined, for example, to (6/16)F, (3/16)F, (2/16)F, (1/16)F, (1/16)F, (1/16)F, (1/16)F and (1/16)F.

Figure 2:
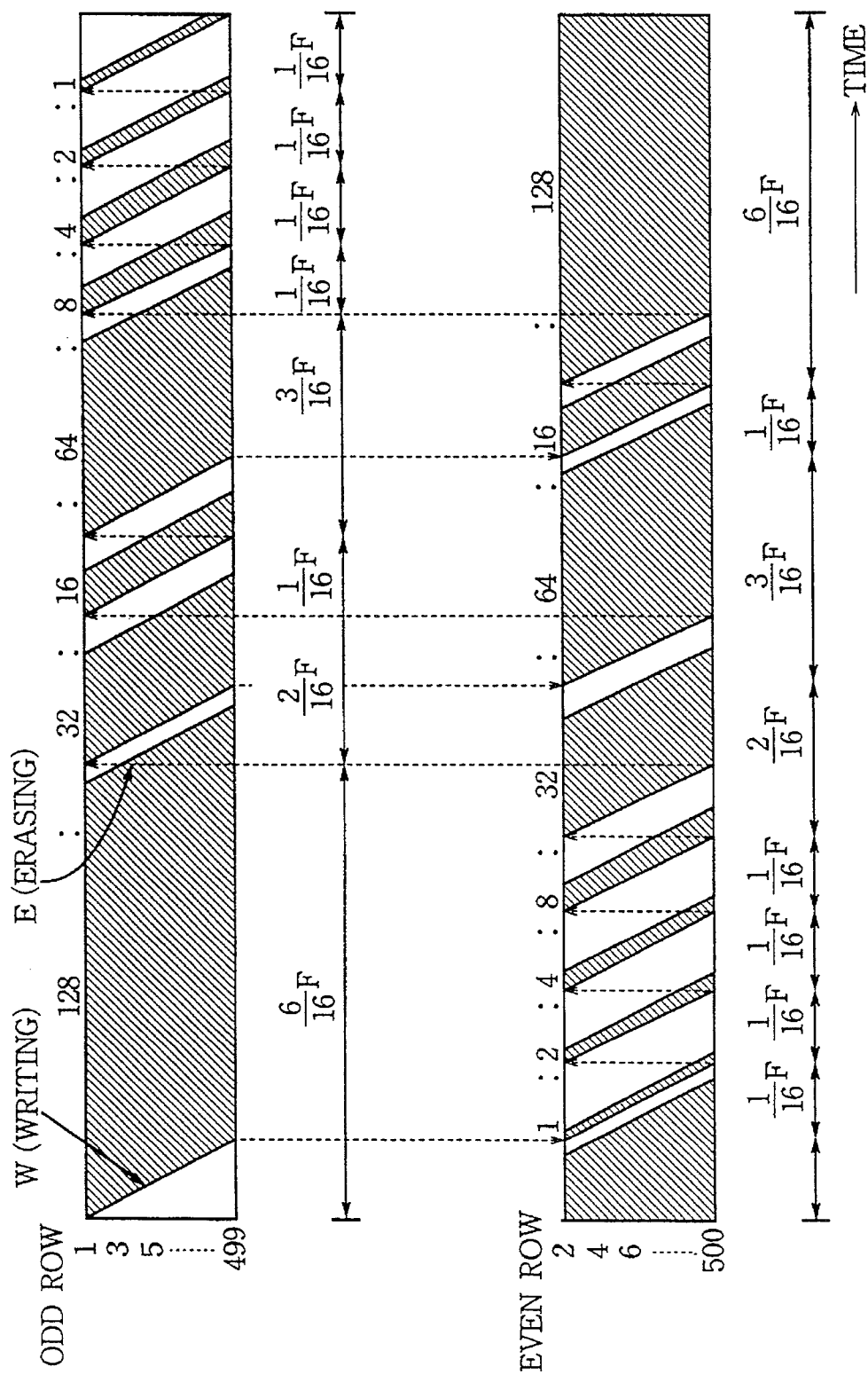
FIG. 2 is a time chart showing a series of writing timing and erasing timing of sub-fields for row electrodes.

FIG. 2 shows a time chart representing an example of the order of the writing and erasing in the interlaced scanning for the eight sub-fields of each of the odd row electrodes 1, 3, 5 . . . 499 and even row electrodes 2, 4, 6 . . . 500. In the odd row electrodes, the time lengths of the sub-fields are arranged in the order of (6/16)F, (2/16)F, (1/16)F, (3/16)F, (1/16)F, (1/16)F, (1/16)F and (1/16)F. The time lengths of the even row electrodes are arranged in the order of (1/16)F, (1/16)F, (1/16)F, (1/16)F, (2/16)F, (3/16)F, (1/16)F and (6/16)F.

In other words, the long sub-field having a large weight of the odd or even row electrode is arranged corresponding to the short sub-fields each having a small weight of the even or odd row electrode so that the writing operations of short sub-fields are performed within the long sub-filed.

A front edge of the hatching area shows the excitation start timing W of each row. A rear edge of the hatching area shows the erasing timing E. The hatching area between the front and rear edges is sustained by the sustaining pulses to maintain the emission of light. As shown by the dotted line arrows, the excitation is performed in sequence.

In operations, the write/erase control circuit 12 applies the exciting signal to the first row electrode driver 13 as scanning pulses. The first driver 13 produces exciting pulses which are applied to the odd row electrode in order at every 2 μs for the first sub-field having the weight of $2^7$. The data electrode driver 11 applies data voltages (1 or 0) to the data electrodes $A_1$ to $A_j$ at every row. The data voltage of "1" or "0" is dependent on the digit value of the 8th place of 8-bit data for each pixel.

The light is emitted at the pixel on the intersection of the data electrode, if the data electrode is energized by the voltage of "1" under the condition that the corresponding odd row electrode is applied with the exciting pulse in accordance with the pixel data. When the sustaining pulse is applied to the row electrode, the emitting light is maintained. When the erasing pulse having a pulse width smaller than the exciting pulse is applied to the row electrode at the terminal edge of the first sub-field, the light on the pixel is erased. Similarly, the second row electrode driver 14 is operated to drive the even row electrodes, while the data electrode driver 11 applies the data voltages to the data electrodes.

Thereafter, the operation is repeated.

In the operations for driving the panel, first, the longest first sub-field of 128 weights of the odd row electrodes are performed, and immediately after, the 8th, 7th, 6th, 5th and 3rd for sub-fields of 1, 2, 4, 8 and 32 weights of the even row electrodes are performed. Next, the sub-field of 32 weight in the odd row electrodes is effected, and the sub-field of 64 weights is effected in the even row electrodes. Then, the sub-fields of 16 and 64 weights are effected in the odd row electrodes and the sub-fields of 16 and 128 weights are effected in the even row electrodes. Finally, the sub-fields of 8, 4, 1 and 1 weights are effected in the odd row electrode.

By combining eight digits of the sub-fields, various tone are obtained.

In the embodiment, the row electrodes are divided into two groups and the sub-fields are provided in each group, and sub-fields of both rows are energized in parallel. Thus, the scanning time of the field is reduced to a half of the conventional method. Accordingly, time length of the sub-field can be increased, thereby increasing the luminance of the picture.

Although the above described interlaced scanning is performed by dividing the rows into the odd and even rows, row electrodes every n (integer of 2 or more) rows are determined as one group and remain may be determined as another group. The row electrodes may be divided into three groups or more.

The arrangement of the sub-fields is not limited in the above described embodiment if the writing timing is deflected on the time axis of the sub-fields. In the embodiment, the writing timings are continuously set, thereby providing a proper example.

In accordance with the present invention, the row electrodes are divided into a plurality of row groups and a plurality of sub-fields are applied to each row. Since the sub-fields belonging the rows of the groups are parallely energized, the scanning time is largely reduced. Accordingly, the time length of each sub-field can be increased, thereby increasing the luminance of the picture.

While the presently preferred embodiment of the present invention has been shown and described, it is to be understood that this disclosure is for the purpose of illustration and that various changes and modifications may be made without departing from the scope of the invention as set forth in the appended claims.

What is claimed:

1. A method for driving electrodes of a gas-discharge display panel having a plurality of data electrodes and a plurality of scanning row electrodes for displaying an image dependent on pixel data each of which comprises N bits, and each of digit positions of the bits represents a weight for a tone of an image, comprising steps of:

dividing each of the scanning row electrodes into at least two row groups comprising a first row electrode and a second row electrode;

dividing a time length of a field into N sub-fields corresponding to the number of the N bits of the pixel data, each of the sub-field having a time length different from other sub-fields to be allocated with a weight, and each weight corresponding to the weight of the corresponding digit of the pixel data;

arranging sub-fields for each of the first row electrodes and sub-fields for each of the second row electrodes in such a manner that an arranging order of the sub-field of the first row electrode is different from that of the second row electrode;

executing scanning of the first and second row electrodes in accordance with the arranging order of the sub-fields of both of the row electrodes; and driving the data electrode during each sub-field in accordance with the value of the digit of the pixel data, thereby providing a tone in an image on the display panel by modulating a time length of light emission.

2. The method according to claim 1 wherein the first row electrodes are formed by the odd row and the second row electrodes are formed by even row.

3. The method according to claim 2 wherein the number N is eight, the arranging order of the sub-fields is that a 1st sub-field in the odd row, 8th, 7th, 6th, 5th and 3rd sub-fields in the even row, a 3rd sub-field in the odd row, a 2nd sub-field in the even row, 4th and 2nd sub-fields in the odd row, 4th and 1st sub-fields in the even row, and 5th, 6th, 7th and 8th sub-fields in the odd row.

4. The method according to claim 3 wherein the ratio between two time lengths of adjacent sub-fields from the first sub-field to the 8th sub-field is as follows:

6:3:2:1:1:1:1:1.

* * * * *